United States Patent [19]
William

[11] Patent Number: 4,740,890
[45] Date of Patent: Apr. 26, 1988

[54] SOFTWARE PROTECTION SYSTEM WITH TRIAL PERIOD USAGE CODE AND UNLIMITED USE UNLOCKING CODE BOTH RECORDED ON PROGRAM STORAGE MEDIA

[75] Inventor: Tobin William, Stamford, Conn.

[73] Assignee: Software Concepts, Inc., Stamford, Conn.

[21] Appl. No.: 564,170

[22] Filed: Dec. 22, 1983

[51] Int. Cl.⁴ ............................................. G06F 12/14
[52] U.S. Cl. ......................................... 364/200; 380/4
[58] Field of Search ... 364/200 MS File, 900 MS File, 364/ 300; 178/22.08, 22.01; 340/825.34; 360/15, 53; 380/3, 4, 25

[56] References Cited

U.S. PATENT DOCUMENTS

| | | | |
|---|---|---|---|
| 3,893,084 | 7/1975 | Kotok et al. | 364/200 |
| 4,040,034 | 8/1977 | Belady et al. | 364/200 |
| 4,278,837 | 7/1981 | Best | 364/900 |
| 4,433,207 | 2/1984 | Best | 178/22.08 X |
| 4,439,830 | 3/1984 | Chueh | 364/200 |
| 4,442,486 | 4/1984 | Mayer | 364/200 |
| 4,446,519 | 5/1984 | Thomas | 364/300 |
| 4,454,594 | 6/1984 | Heffron et al. | 364/900 |
| 4,458,315 | 7/1984 | Uchenick | 364/200 |
| 4,471,163 | 9/1984 | Donald et al. | 364/200 |
| 4,550,350 | 10/1985 | Billings | 360/15 |
| 4,553,252 | 11/1985 | Egendorf | 377/15 |
| 4,590,557 | 5/1986 | Lillie | 364/200 |
| 4,593,376 | 6/1986 | Volk | 364/900 |
| 4,658,093 | 4/1987 | Hellman | 380/25 |

Primary Examiner—Archie E. Williams, Jr.
Assistant Examiner—Florin Munteanu
Attorney, Agent, or Firm—Arthur L. Plevy

[57] ABSTRACT

An apparatus for preparing and playing back a duplicated disk containing software as a program so that a customer will be able to use the disk for a predetermined trial period. The duplicated disk is impressed with information relating to this system in the form of a usage count, a locking status and an output code. The usage count is written on the disk and determines the number of times the disk can be used by a customer. The output code identifies a locking code whereby after the allocated number of uses is over, the vendor can unlock the disk to allow unlimited use. The lock code determines whether or not the disk is subjected to the above noted trial usage period. The usage count which is impressed on the disk is detected during each time the disk is used and the usage count is decremented by one until the predetermined number of uses has been accommodated. When this occurs, the usage count becomes zero and this is detected to terminate usage and to access the keyboard of a microprocessor or computer to thereby allow the system to receive the unlocking code from the vendor. If the unlocking code is received, the disk can now be used by the customer without limitation. However, if the proper code is not received, the disk cannot be used by the customer as the system will prevent further use of the program until a proper locking code is inserted via the keyboard of the computer or microprocessor during operation of the program contained on the disk.

12 Claims, 4 Drawing Sheets

SOFTWARE PROTECTION SYSTEM WITH TRIAL PERIOD USAGE CODE AND UNLIMITED USE UNLOCKING CODE BOTH RECORDED ON PROGRAM STORAGE MEDIA

BACKGROUND OF THE INVENTION

This invention relates to a protection apparatus for a computer program and more particularly to an apparatus and method which will enable one to disable a program after a specified number of uses.

As is widely known, the advent of the home computer as well as the business computer has resulted in the generation of a multitude of programs for various purposes. Essentially, many of these programs are developed by independent software suppliers who will formulate various programs for use on many different types of machines. As such, these programs relate to all different businesses and are distributed by the software houses to potential customers.

As is well known, a major problem in regard to the distribution of such programs is the copying of such programs or the unauthorized use of such programs without compensating the originator for their value.

Based on marketing procedures, it is a common practice for a software supplier to loan a program to a potential customer to allow the customer to use the program over a trial period so that he can determine whether or not it is compatible with his needs. In this manner many such programs have been copied by the potential customer and returned to the originator without compensation. Other customers have used the program without paying for it over prolonged periods of time and the burden of retrieving the program falls on the originator. This creates great problems for software houses in regard to this type of marketing approach.

It is, therefore, an object of the present invention to provide apparatus as well as a method of preventing the above situations from occuring. The apparatus employed allows a software company or a program originator to furnish a program which can only be used for a predetermined number of times. This number is indicative of a trial period by which a user can test the program to determine whether it is compatible with his present needs. At the end of a predetermined number of uses, the program will be disabled by the apparatus and according to the method and thereby the user will be prevented from using the program unless a specified coded number is obtained from the software supplier or originator.

Once the number or code is obtained, the user can continue to use the program without restriction, and of course, this would be consistent with the user paying for the program.

SUMMARY OF THE INVENTION

Apparatus for protecting a program which program is stored on a storage medium such as a magnetic disk, to enable a user to utilize said program via a computer processor for a trial test period, comprising first means for recording a predetermined indication on said medium indicative of the number of times said program can be used, means for accessing said indication when said medium is being used by said computer processor, means for decrementing said indication on said medium during each use, further means responsive to said indication to detect a state indicating a specified number of uses indicative of the end of said trial test period to provide an output signal, and means responsive to said output signal for blocking the further use of said program as stored on said medium whereby said computer processor is prevented from processing said program further upon detection of said output signal.

DESCRIPTION OF THE PREFERRED EMBODIMENT

Before proceeding with a description of the apparatus and method according to this invention, a brief description of the techniques used in mass producing a program will be described.

As indicated, the purpose of this invention is to describe apparatus and the method of protecting programs in such a manner that the programs may be shipped to prospective customer for a predetermined trial usage period. At the end of this period, which is manifested by the number of times the customer uses the program, the apparatus and system will prevent the customer from making further use of the program without receiving approval from the vendor.

For purposes of explanation of the system and in describing the figures, it will be assumed that the program will be distributed on a magnetic disk as the various types of disks which are widely available and utilized for program information.

It is, of course, understood that the method and apparatus described will work equally as well as when using other forms of program media such as magnetic tape, programmable microelectric circuits, and so on. In any event, most distribution media contain a mechanisim for protection against unauthorized duplication. There are many techniques for doing this and essentially such techniques are well known and not considered part of this invention.

The techniques are incorporated in the program format to prevent a customer from duplicating a disk and therefore requiring the customer to utilize the vendor's disk in order to implement the program.

Figure 1:
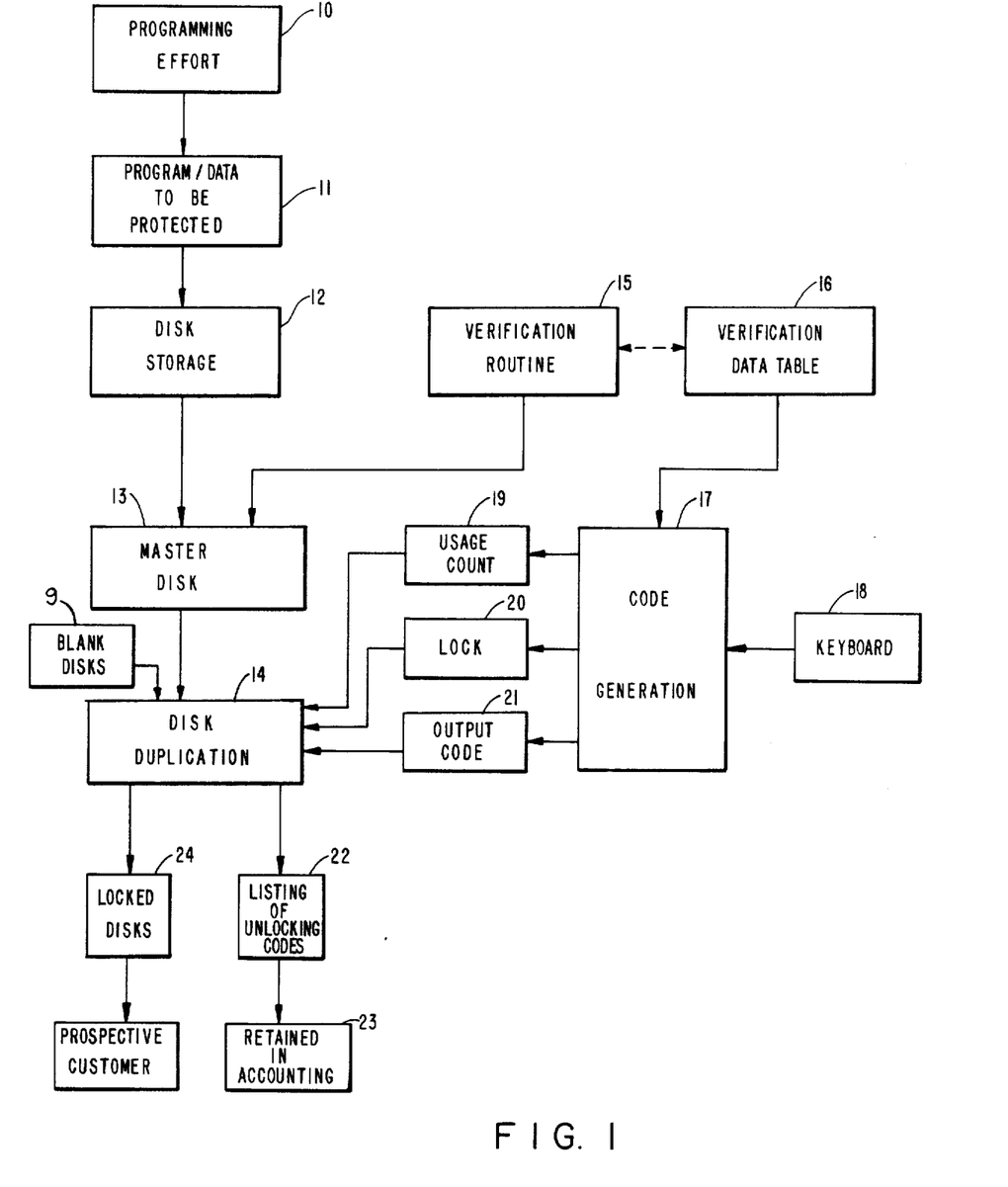
FIG. 1 is a flow chart depicting the implementation of the protection scheme during duplication of a program.

Referring to FIG. 1, there is shown a block diagram depicting the steps necessary to practice the present invention. Essentially, a disk is made by first implementing a programming effort and then storing the programmed data in a disk storage memory where it is then transferred to a master disk. These steps in the procedure are depicted in FIG. 1 referring to modules 10, 11 and 12. The program data which is stored in storage 12 is transferred to a master disk 13 by conventional techniques. The master disk is utilized to generate product disks which are the disks sent to the customers. Thus the output from the master disk is directed to a disk duplication station or process designated by numeral 14.

At this station blank disks 9 are written into so that the program data stored on the master disk is transferred to the blank disk to create the particular program desired. The step of producing duplicate disks from a master disk as well as the steps of providing programmed information for the master disk are well known in the art and are not considered part of this invention.

In generating the master disk, a verification routine 15 which is table based is standard for a particular vendor. This verification routine is stored on all master disks along with the program data which is to be protected. As will be explained, the verification routine 15 may be placed into any buffer or otherwise used in unitialized storage areas on the disk. A verification data table 16 is generated for each program which is to be protected. This data table is provided in order to alter the unlocking codes which are to be used for the different programs. In this manner, a code, once relayed by the vendor, is used to enable a customer to unlock a particular program. This code for unlocking the one particular program could not be employed to unlock any other program which may also be distributed by the particular vendor.

The verification data table 16 is inputed to a code generator 17. The code generator also receives an input from a keyboard 18. During disk duplication, the code generator produces a usage count which is inputed to an output register 19 and a lock code which is sent to a register 20. The purpose of the register lock code is to signify whether the disk is restricted to a number of uses as to whether it is locked or whether it is unlocked and therefore subjected to unlimited usage.

The code generator also produces an output code which is stored in register 21. This code is unique to each disk generated and is essentially the code which will be required by the customer to continue usage of the program after the specific number of trial uses have been accomplished.

During the duplication process, each disk has impressed thereon the usage count from register 19, the lock condition as to whether it is locked or unlocked from register 20 and the output code for the disk from register 21. As the disk is being duplicated, the output codes are read from each disk and stored in a register 22 which is associated with a printer and hence each disk as being duplicated is associated with a series of unlocking codes in accordance with the output code of the disk. These unlocking codes are retained by the vendor for future use. Each disk may receive a serial number during the duplication process and this serial number of the disk would therefore be associated with a particular output code from register 21. In this manner the vendor knows the particular unlocking code for each disk. The output code will only be provided when the disk is a locked disk as evidenced by an output from register 20.

Thus during disk duplication, each locked disk is indicated and stored in register 24 so that the vendor knows which disks as supplied to a customer have limited access.

Figure 2:
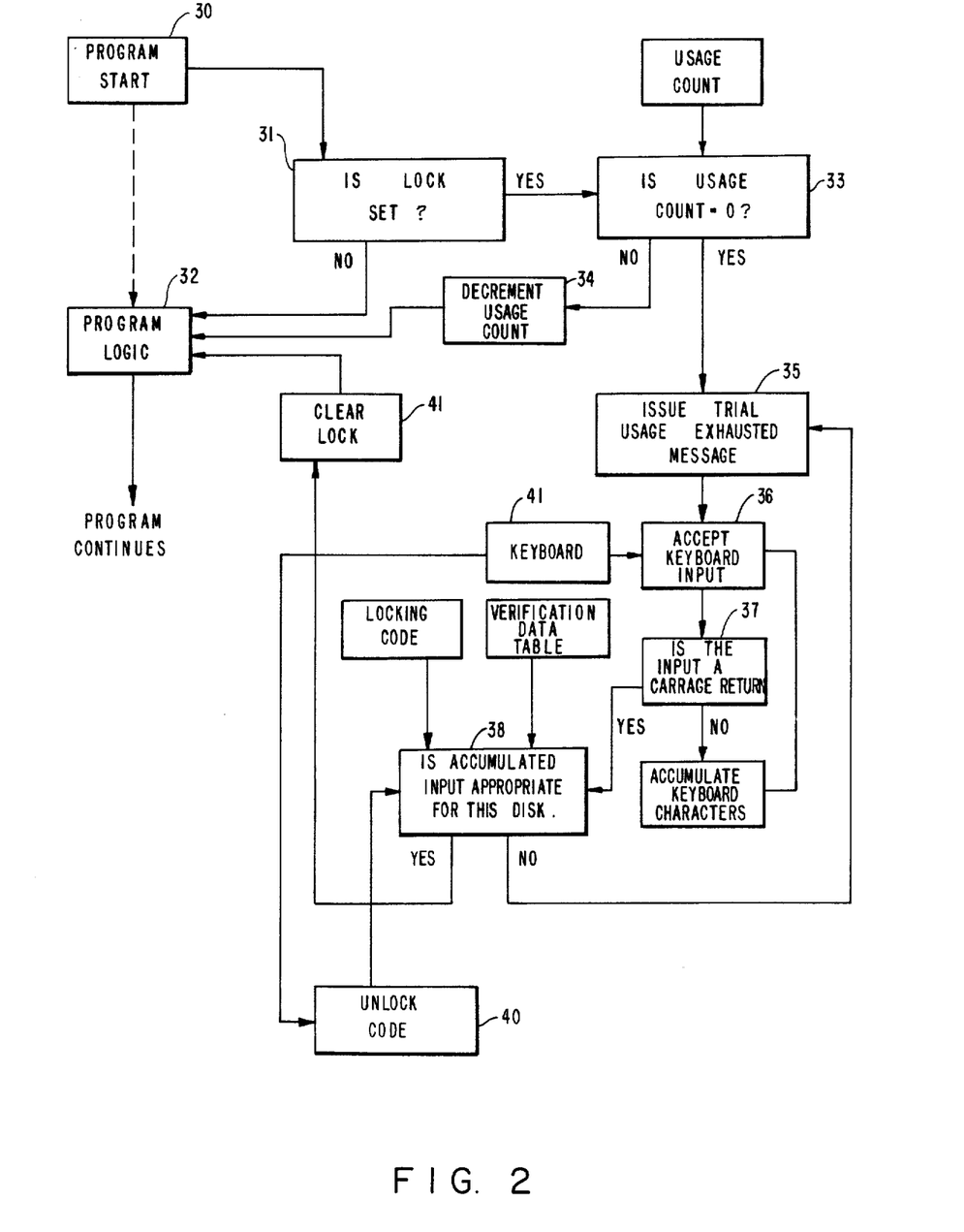
FIG. 2 is a flow chart depicting operation of the system when a protected disk is being used.

Referring to FIG. 2, there is shown a flow chart indicative of the operation of the above described system together with an actual program to be protected. Referring to module 30, which is indicated as "program start", the customer takes a disk as fabricated according to the procedure indicated in conjunction with FIG. 1 and places the disk in a computer or processor to start using the program. The program will then access the coded information shortly after the program starts, and normally this will be done after the computer displays the program's name, serial number, vendor, and so on.

This accessing of the code is protected in a customary way in order to prevent a person with programming knowledge from circumventing the execution of the limited usage code. This limited usage code will be executed once and once each time the program is initiated and it, therefore, may be conveniently placed in some buffer or unitialized memory area thereby adding a further degree of protection. In this manner, once the protected program is being executed, the protection code is no longer in memory. This saves memory storage in the computer, as will be explained. The program as indicated would cause the computer to read the locking information stored on the disk as indicated by module 31. Module 31 essentially determines whether or not the disk is a locked disk. If it is not a locked disk, then the program logic continues as indicated by module 32. If it is a locked disk, as determined by the system, the apparatus causes the usage count which was impressed upon the disk to be read as specified in module 33. The logic determines whether or not the usage count is zero which would indicate that all the predetermined number of uses have been exhausted. If the usage count is not zero, then the usage count is decremented as specified by module 34 and written back into the disk thereby storing on the disk a new usage count which is one less than the last count.

As will be further explained, the usage count as written is immediately reread from the disk and compared to the updated usage count which was attempted to be written into the disk in order to ascertain that the new count as written is proper. This assures that the customer cannot obviate the system by flawing the disk at the usage storage location or by swapping disks and so on.

If the usage count becomes exhausted, which means that it is now at zero, then a message indicating the trial usage period is over is issued as evidenced by module 35. After this message is issued, the program automatically accesses the keyboard to accept input from the keyboard as indicated in module 36. This input is accumulated until a carriage read or other terminating character is entered as shown in module 37. When a terminating character is entered, the locking code is read from the disk and this code, together with the verification data table which is indicative of the particular vendor, are processed to determine whether there is a go or no-go condition as indicated by module 38.

If the result is no, which means that the disk is actually exhausted, the apparatus will issue the trial period exhaust message or as will be explained will totally abort the entire protected program by means of a standard restart technique. This is a preferred method since this condition will not be indicated or stored in the computer memory and therefore will prevent a knowledgeable person from making some independent determination of what has occured.

As indicated above, the user cannot use the program any longer until he receives an unlock code from the vendor. This unlock code is then placed in the system as indicated by module 40 which can be accomplished via the keyboard 41. Once the system, via module 38, determines that the unlocked code is present and that the unlock code compares with the locking code for the disk, then a clear lock signal is provided as indicated by module 41. This clear lock signal changes the lock condition on the disk so that the next time the program is used, the lock will not be set and the program can be continued to be used without restriction.

The details of the flow chart, as described above, will be further specified by examples of typical logic modules to be employed in implementing the flow charts in FIGS. 1 and 2. The general philosophy and operation of the system is as follows.

A disk using the coded mechanism in regard to a specified number of uses will contain the vendors program and is sent to a prospective customer. The prospective customer would use the program just as if he had purchased it. All program documentation would be pertinent and followed without regard to the fact that the disk was a coded or a locked disk. Following several trial usages, if the customer elects to acquire rights to continue the program, he would contact the program's vendor and make contractural or final arrangement with the vendors. Once the vendor has received the customer's purchase order, the vendor would look up the customer's unlocking code by referring to a list of unlocking codes which are generated during disk duplication. The vendor will give the customer the unlocking code in any manner deemed necessary. When this unlocking code is entered into the system as shown in FIG. 2, the protected program on the disk becomes unprotected and the customer is provided with unlimited usage of the program without further vendor contact.

Figure 3:
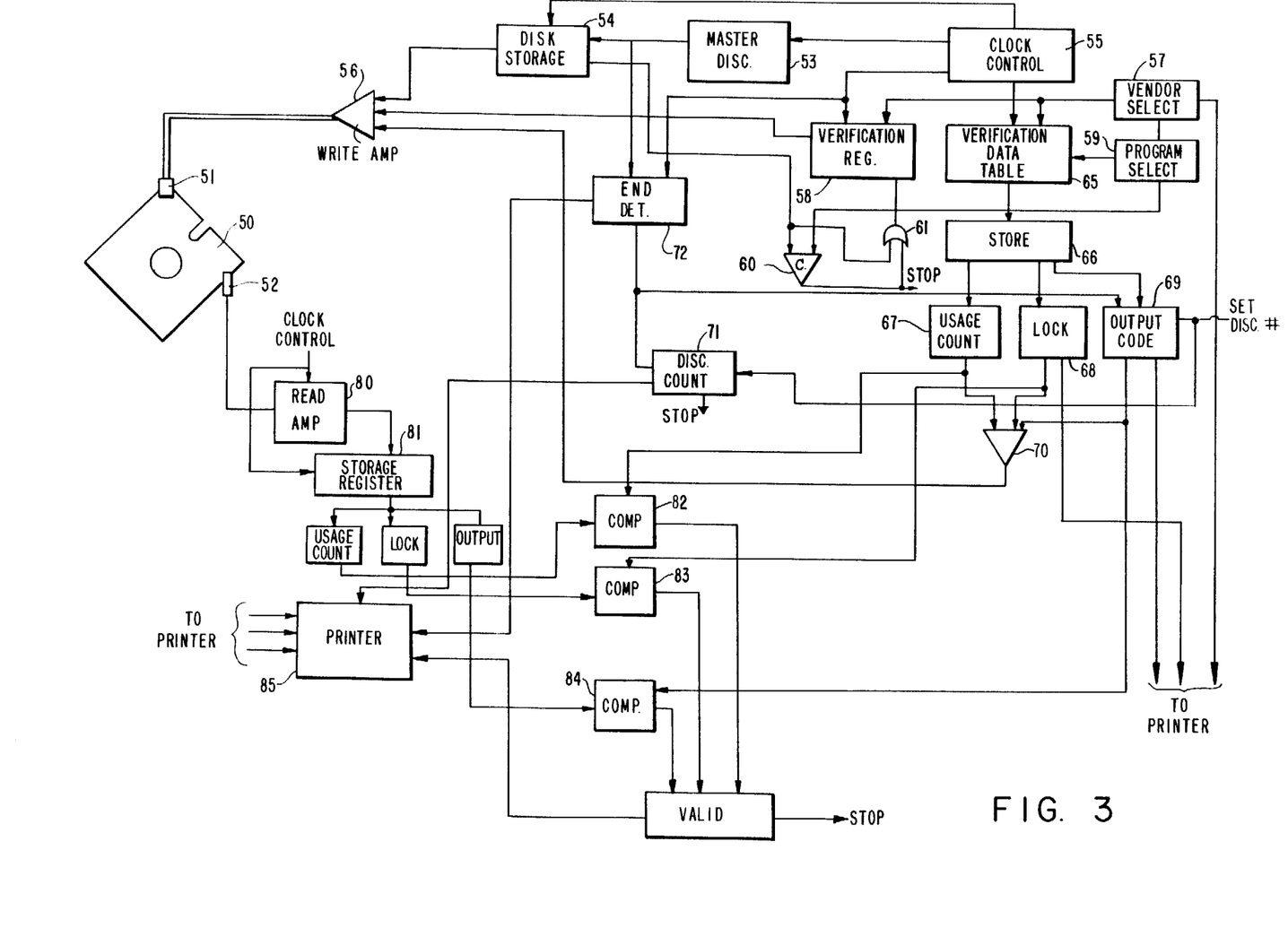
FIG. 3 is a detailed block diagram showing circuitry which may be employed to prepare protected disks during a duplication process.

Referring to FIG. 3, there is shown a block diagram of a system which may be employed to place the coded information as above described on a duplicate disk. The block diagram will be using simplified codes and it will be apparent to one skilled in the art that different code sequences can be utilized as well in order to implement the system.

Blank disk 50 is placed in a duplicating mechanism which normally contains a write head 51 and a read head 52. The writing and reading of magnetic information on a magnetic disk is well known in the art and there are many techniques for doing so. The master disk 53 is placed in a suitable transport and the program data imposed on a master disk is retrieved and stored on a bit by bit basis either serial or in parallel in a disk storage register 54 which register is under the control of a data clock 55. In order to simplify explanation, it will be assumed that the data is impressed upon the disk 50 in a serial pattern, and as the heads move, data is placed upon the tracks of the disk via the write amplifier 56. The master disk 53 conveniently contains a particular program which may be sold under various trade names by more than one vendor.

Each vendor may have a series of programs which it is marketing under different names and for different purposes. As shown in FIG. 3, a register or memory 57 will store the digital code indicative of each vendor for which disks are being prepared. For purposes of explanation, let us assume that each vendor is represented by a particular binary code such as Vendor A being a zero, Vendor V being 01, and so on. The manufacturer of the disk will set register 57 to the particular vendor for whom the present batch of disks are being made. The setting of a register to any desired code is well known in the art and many examples of suitable circuitry are widely available in integrated circuit form.

The particular code for the vendor is directed from the select register 57 to a verification register 58. The verification register 58 receives the vendor code 57 from the vendor select register. Also shown coupled to the vendor select register is a program select register 58. The function of the program select register is to allow the disk duplicator to set the register to the code for the program which is being reproduced.

For example, as indicated, each vendor, as Vendor A, may sell a plurality of programs, each for a different purpose. The function of the program select register 59 is to permit a setting of the register for the name of the program which program is on the master disk 53. Hence at the onset of the process, registers 57 and 58 are set for the particular vendor and for the particular program which is being duplicated. The output of the program select register is coupled to one input of a comparator 60 having its other input coupled to the disk storage register 54. The contents of the master disk 53 are stored in the disk storage register 54. The comparator 60 is clocked so that it will compare the program select code on the master disk with the program select code in register 59. If the codes are the same, indicating that the proper program is on master disk 53, then this information is gated via gate 61 to the verification register which now writes the vendor code and the program code onto the disk via the amplifier 56. The vendor select register is also coupled to a verification data table or register 65.

The verification data table has stored therein information for each vendor. Essentially, the verification data table may be a RAM or ROM memory which has stored therein information for each vendor, such as the usage code, the lock code, and the output code. These codes may be different for each vendor, as should be apparent to one skilled in the art. In any event, the vendor select register causes the data table 65 to be accessed at the proper vendor storage location such that the contents of the location are directed to the storage register 66.

Register 66 stores a binary number where certain bits are reserved for the usage count. Other bits determine whether the program is a locked or unlocked program and the remaining bits are indicative of the output code for that particular vendor.

As shown in the Figure, the information in register 66 is directed to separate registers, for the sake of simplicity, designated as registers 67, 68 and 69 and referenced as usage count, lock and output code, respectively. The information stored in each register is directed to the write amplifier 56 via a coupling amplifier 70. Thus based on the clock control during the next signal, after the verification information has been written on the disk, the system causes a usage count, a lock code and an output code to also be written on the disk. The output code register 69 is a shift register which can be preset by the disk user in accordance to the number of disks to be provided from the master 53 during a run.

For example, this is to implement the use of different codes for each disk. There is also shown a disk counter 71. The counter 71 receives the set disk count and decrements the count be one for each duplicate disk that is being made. Another input to the disk counter is derived from an end detector 72. The function of the detector 72 is to determine the end of the program as stored on the master disk 53. The end of the program is designated by a predetermined digital code which is detected by the end detector 72. Upon detection of this code, the end detector decrements the disk counter 71 by one count and also decrements the output code register 69 by a predetermined number or by a single digit so that the next disk being duplicated will receive a different output code. The read head 52 serves to read the information as being written on the disk 50 via a read amplifier 80 which is also under the control of the clock 55. The data emanating from the read amplifier is stored in the storage register 81 which is also under clock control and which gates out the data to a series of comparators 83, 83, and 84.

Each comparator, as indicated, compares the information in registers 67, 68 and 69 with the information read from the disk. If a favorable comparison is made during each time period, the comparators indicate a valid condition which then causes a printer 85 to print out the disk number which is obtained from the disk counter 71 and the output code. The printer further prints out the vendor's code as well as the output code from register 69 which is indicative of the unique code for that particular disk number. The printer will also print out the condition of the disk from register 68 as to whether it is a locked disk or not and may also print out the usage count from register 67 indicating how many times the disk can be used.

The printing occurs when the end detector 72 has completed printing of the program data and at this time the contents of the registers are printed out before the output code register 69 is reset. At this time, a new disk 50 will be placed in the equipment and the above described process will continue again. The new disk will receive a new output code from register 69 so that the vendor can distinguish one disk from another.

The output code which is printed is sent to the vendor with each of the numbered disks so that the vendor now has a series of unlocking codes for customer use.

It is, of course, apparent, that if the comparators as 82 to 84 do not indicate a valid comparison, then the system is stopped and checked further to determine the error. It is noted that the read head 52 is positioned to only read data from the tracks upon which the coded information necessary to implement the protective system is placed. It should be readily apparent to one skilled in the art how to implement the above noted system as one may use a serial data under control of clock whereby the various signals of the clock are timed so that access is always had to the clocked data locations. This is called a synchronous system.

It is, of course, understood that the above logic can be implemented by parallel read as well or by the use of a microprocessor to generate the various codes. In any event, the system will allow a master disk 53 to be copied for any one of a number of vendors whereby each vendor may market the program under a different name which would be inserted according to the vendor by the verification register which contains the particular program name for that vendor. It is also understood that based on the verification data table, each vendor may have a different usage count and a different output code for each program and for each disk. This information is stored in the verification data table.

Figure 4:
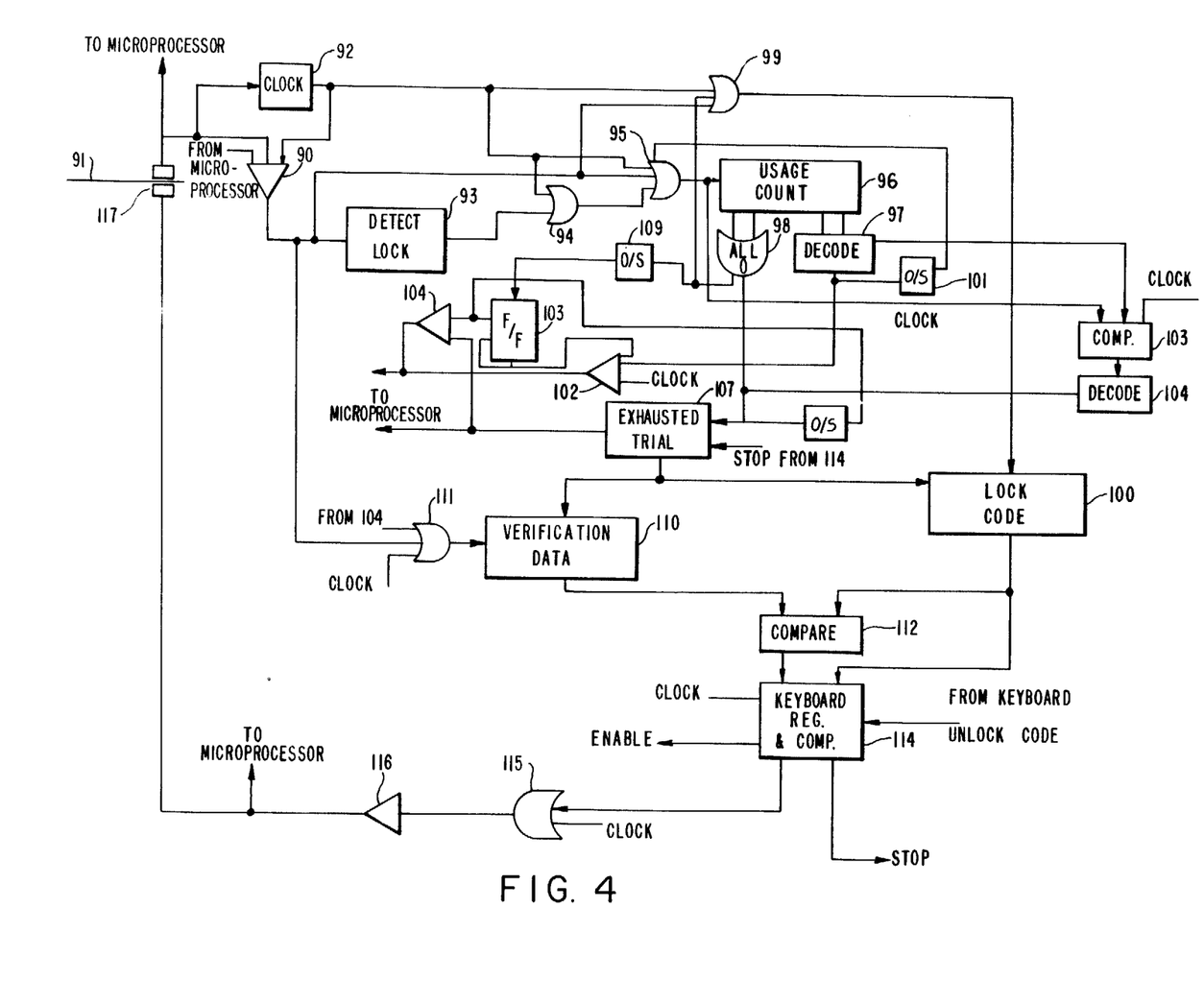
FIG. 4 is a detailed block diagram showing circuitry which may be used in the playback of a protected disk during system operation.

Referring to FIG. 4, there is shown a block diagram of circuitry which may be used to implement the protection technique according to this invention.

A read amplifier 90 is shown having one input coupled to the read head for reading data from the disk 91. Another input is from the clock 92. The clock 92 essentially provides a series of timing gates to enable the various functions to be described to be implemented in a sequence. This type of clock as indicated is well known and assures that the logic proceeds in an orderly fashion wherein each function is performed during its own timing interval as was done for impressing each function on the disk via the clock 55 as shown in FIG. 3. Thus the clock is shown as having a single output but essentially consists of a cable wherein each wire of the cable contains a different timing interval for logic operation. Gate 90 has a further input which comes from the microprocessor. Essentially, when the disk is placed in the microprocessor, the protection sequence is detected and the microprocessor recognizes this call on the disk and activates gate 90.

Gate 90 is clocked so that it reads the lock signal from the disk via the detection lock circuit 93. As indicated, if the disk is a locked disk, it means that it is subjected to a trial usage period. This data is written on the disk and is detected by the detection lock circuit 93 which may be a register and a decoder to thereby decode the fact that the disk is a locked disk. The output from the detection lock circuit is coupled to one input of a gate 94 with the other input coming from a different phase of the clock.

Gate 94 is activated to enable gate 95 which is also clock controlled and which has an input coupled to amplifier 90 so that gate 95 will provide an output during the usage count interval and the usage count is clocked into counter 95 which is set to the usage count as read from the disk. The counter 95 is an up-down counter and is set by gate 96 to the usage count which is indicative of the number of trial uses the disk is programmed for. The output of counter 96 is coupled to a series of decoders 97 which essentially decode the count.

There is also shown an all zero decoder 98 which, of course, will decode the all zero state of counter 96. The gates are also clock controlled so that the outputs are read out only after the usage counter has been set.

A further gate 99 is shown which is also clock controlled and which reads the lock code which is stored on the disk and which lock code is placed in a lock code register 100 for storage therein. If the usage count is not zero, this is detected by the decoders 97 which provide an output indicative of the usage count and which triggers a one shot 101 to decrement the counter by one count. This count is then decoded by the decoders 97 and applied to the input of a clocked gate amplifier 102 which has another input coupled to the output of a flip/flop 103. If the usage count is not zero, and after the counter 96 has been decremented, the amplifier 102 impresses the new count on the disk. This is accomplished by sending a signal to the microprocessor which assures that the data from amplifier 102, indicative of the new usage count, is placed in the usage count slot on the disk track. Thus the disk receives the new usage count as written by amplifier 102.

The microprocessor then causes the usage count as written on the disk to be inputted via gate 95 to a comparator 103 which now compares the count from the decode gate 97 with the count on the disk. As indicated, this occurs to verify that the count as written on the disk is the same count as exists in the decode counter. If the count is not the same, this is detected via the decode gate 104 which then triggers the exhausted trial counter 107 which sends a message to the microprocessor and further forces the usage count as written on the table to zero indicating that the trial period is over.

Essentially, if the count as written on the disk is not the same as the count in the usage counter, then it is assumed that the user is attempting to circumvent the system, and the trial usage period is then terminated. If the usage count is not zero, the program is not interrupted and the user will continue using the program without further difficulty as evidenced by the above logic.

Now assume that the usage count is, in fact, zero. If this occurs, then the usage count decoder 98 will detect the all zero state of counter 96. When this occurs, the all zero gate 98 will trigger a one shot 109 which sets flip/flop 103. The setting of flip/flop 103 enables the amplifier gate 104 which was formerly disabled or reset. The gate 98 further triggers or sets the exhausted trial register 107 where the exhausted trial message which is also sent to the microprocessor is then caused to be displayed. The exhausted trial register further enables the lock code register 100 and verification data register 110.

During this mode, gate 111 is enabled by the clock and by amplifier 104 to enable the gate to transfer the verification data as written on the disk into the register 110. The microprocessor will back the disk up so that this information is now available. The verification data in register 110 is compared with the lock code to determine, as indicated previously, whether this is a correct locking code for the particular vendor.

The comparison is implemented by means of comparator 112 which signals register 114, designated as a keyboard register and comparator, that this is a correct trial usage termination. The keyboard register 114 then sends an enable to the microprocessor which enables the keyboard. Thus the keyboard register will now expect to receive the unlocking code from the keyboard which indicates that the user has received the proper code from the vendor. If the proper code has been received from the vendor, this is compared in the comparator contained with the keyboard register, and the microprocessor will receive an enable signal via gate 115. At the same time, the lock code is changed on the disk by means of amplifier 116 which is coupled to the write head 117 and thus the disk becomes unlocked due to the fact that the keyboard received the proper unlock code.

If the information from the keyboard is not an unlock code but consists of other characters as explained, the keyboard register will accumulate the characters and send a final signal designated as a stop signal to the exhausted trial register 107. This causes the exhausted trial signal to send a final signal to the microprocessor whereby the microprocessor will continue to refuse to process the disk.

As one can see, this action will continuously repeat each time the disk is accessed due to the fact that the all zero count will continuously be detected.

The above described logic in regard to FIGS. 3 and 4 is by way of example only, and it is understood that there are many ways of implementing the logic as well as the various functions as described.

It is, of course, understood that the logic depicted above may be implemented in software programming the microprocessor via the disk to implement the various steps depicted by means of a program rather then by hard wired logic as shown in FIG. 4 and this may be done for example according to the flow chart illustrated. One skilled in the art would immediately understand that the microprocessor contains the required clocks, registers and other components necessary to fully and completely implement the logic described above. It being understood that the primary purpose and object of the invention is to allow any program which is prerecorded on a medium such as a disk to be offered to a user for a predetermined number of uses after which trial period the user will not be able to use the disk without receiving from the vendor or owner a proper unlocking code.

Accordingly, by utilizing such a system, the vendor is enabled to protect his proprietary rights in the program while still offering the use of the program to a customer in order for the customer to make a determination or whether or not the program will be useful in his business pursuits.

While the above described system depicted a technique for generating the output or locking code at the same time that the disk is created, it is expressly understood that the output code can be generated on an already prepared disk but use of independent apparatus which will then take predetermined disks and generate output codes in the manner described in conjunction with FIG. 1. It is, of course, further understood that the master disk such as disk 53 of FIG. 3 can also contain output codes and, therefore, limited use disks may be produced directly from a master disk during the production of disks. In this manner the detection apparatus as explained in conjunction with FIGS. 1 and 4 will still be necessary.

I claim:

1. Apparatus for protecting a program stored on a storage medium such as a magnetic disc, for enabling trial use of said program in connection with a computer processor, said apparatus comprising:
    first means for recording a predetermined indication on said medium indicative of the number of times said program can be used,
    second means for recording a predetermined code on said medium associated with said predetermined indication,
    means for accessing said indication when said medium is being used by said computer processor,
    means for modifying said indication on said medium during use to reduce the number of times represented that said program can be used,
    further means responsive to said indication to detect a state indicating a specified number of uses indicative of an end of a period of said trial use to provide an output signal indicative of said end of said period of trial use,
    means responsive to said output signal for preventing further use of said program stored on said medium by said computer processor,
    logic means responsive to said output signal and said predetermined code to permit said computer processor to receive an enable code from an input means and
    means for comparing said enable code with said predetermined code to allow said program to be further used without further interruption upon a favorable comparison.

2. The apparatus according to claim 1, further including;
    third means for recording on said medium a vendor code indicative of a particular vendor supplying said program and means responsive to said vendor code and said predetermined code for determining whether said predetermined code is a proper code for accessing said enabling code.

3. The apparatus according to claim 1, further comprising;

means responsive to said output signal for providing an indication to said user that said program is being blocked.

4. A method of protecting a prerecorded program for use with a computer processor which program is stored on a storage medium to enable a user to utilize the program as stored for a trial test period comprising the steps of:

recording on said medium with said program a first code indicative of whether said program is subjected to said trial test period, a second code indicative of the number of uses of said program, and a third code indicative of an unlocking code to enable said program to be used after said trial period, detecting said first code to determine whether said program is subjected to said trial period, then detecting said second code indicative of the number of allowed uses of said program, decrementing said second code on said medium each time said program is used to provide a new indication, detecting said new indication to determine when said indication is indicative of an end of said trial period, accessing said third code upon detecting the end of said trial period, conditioning said computer processor for the from an input means reception of an unlocking code compatible with said third code, comparing said unlocking code with said third code, and enabling said program to continue in use upon a favorable comparison and preventing said program from continuing upon an unfavorable comparison.

5. The method according to claim 4, wherein said medium is a magnetic disk.

6. Apparatus for protecting a prerecorded program for use with a computer processor which program is stored on a storage medium to enable a user to utilize the program as stored for a trial test period comprising:

means for recording on said storage medium a first code indicative of the number of allowed uses of said program and a second code indicative of an unlocking code, said first code initially reflecting the number of allowed uses of said program during said trial test period, means for detecting said first code during the use of said program to provide a signal indicative of said number, means responsive to said signal to provide an altered signal each time the program is used, said altered signal reflecting the number of remaining allowed uses of said program during said trial test period, recording means responsive to said altered signal to record a replacement first code on said medium in place of a previously recorded first code, means responsive to said altered signal to provide a trial test end signal when said altered signal indicates no further allowed trial test uses of said program remain, logic means responsive to said unlocking code and to said trial test end signal for storing said unlocking code and conditioning said computer processor to receive an unlocking signal from an input means, and means for comparing said unlocking signal with said unlocking code said means for comparing including means responsive to a favorable comparison to enable said user to continue to use said program and responsive to an unfavorable comparison to prevent said user from using said program.

7. The apparatus according to claim 6, wherein said means for recording on said storage medium further acts to store a third code on said medium indicative of whether said recording medium is a protected medium, and means for detecting said third code during program use and to alter said third code if a favorable comparison is obtained to thereby enable uninterrupted use of said program.

8. The apparatus according to claim 7, wherein said means for recording on said storage medium additionally acts to record a fourth code on said medium indicative of a particular vendor code associated with said program as well as said unlocking code.

9. The apparatus according to claim 6, wherein said storage medium is a magnetic disk.

10. The apparatus according to claim 6, wherein said means for recording on said storage medium includes reading means for accessing said codes as recorded on said medium to provide a hard copy of said unlocking code associated with said storage medium.

11. The apparatus according to claim 6, further including:

reading means for accessing said replacement first code as recorded on said medium and comparison means for comparing said replacement first code as recorded with said altered signal as modified to determine whether they are the same.

12. The apparatus according to claim 6, further including:

means responsive to the detection of said trial test end signal to notify a user of this condition.

* * * * *

UNITED STATES PATENT AND TRADEMARK OFFICE
CERTIFICATE OF CORRECTION

PATENT NO. : 4,740,890

DATED : April 26, 1988

INVENTOR(S) : William Tobin

It is certified that error appears in the above-identified patent and that said Letters Patent is hereby corrected as shown below:

Title page:

[75] Inventor: "Tobin William" should read --William Tobin--.
Column 11, line 27-28 "for the from an input means reception" should read --for the reception from an input means--.

Signed and Sealed this

Twenty-third Day of August, 1988

Attest:

DONALD J. QUIGG

*Attesting Officer*

*Commissioner of Patents and Trademarks*